(12) United States Patent
Chen et al.

(10) Patent No.: US 9,900,257 B2
(45) Date of Patent: Feb. 20, 2018

(54) METHOD AND UNIVERSAL INTERFACE CHIP FOR ACHIEVING HIGH-SPEED DATA TRANSMISSION

(71) Applicant: ZTE CORPORATION, Shenzhen, Guangdong Province (CN)

(72) Inventors: Xu Chen, Shenzhen (CN); Dewei Chen, Shenzhen (CN); Liguo Feng, Shenzhen (CN); Hongbo Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 331 days.

(21) Appl. No.: 14/647,474

(22) PCT Filed: Aug. 20, 2013

(86) PCT No.: PCT/CN2013/081815
§ 371 (c)(1),
(2) Date: May 27, 2015

(87) PCT Pub. No.: WO2013/189377
PCT Pub. Date: Dec. 27, 2013

(65) Prior Publication Data
US 2015/0304224 A1   Oct. 22, 2015

(30) Foreign Application Priority Data

Nov. 27, 2012  (CN) .......................... 2012 1 0490534

(51) Int. Cl.
*H04L 12/28*      (2006.01)
*H04L 12/859*     (2013.01)
(Continued)

(52) U.S. Cl.
CPC ...... *H04L 47/2475* (2013.01); *G06F 13/4282* (2013.01); *H04L 47/628* (2013.01);
(Continued)

(58) Field of Classification Search
None
See application file for complete search history.

(56) References Cited

U.S. PATENT DOCUMENTS 7,013,354 B1   3/2006  Beck et al.
7,019,637 B1 * 3/2006  Johnson ................ G08B 21/12
                                                    340/506
(Continued)

FOREIGN PATENT DOCUMENTS

CN      1885747 A     12/2006
CN    101145146 A      3/2008
(Continued)

*Primary Examiner* — Zewdu A Beyen
(74) *Attorney, Agent, or Firm* — Ling Wu; Stephen Yang; Ling and Yang Intellectual Property

(57) ABSTRACT

A method for achieving high-speed data transmission is disclosed. The method includes: repacking a data packet to be transmitted using a preset bit width and adding a check code; for a correct response message, releasing system resources immediately, and for an incorrect response message, implementing an automatic retransmission operation on the data packet, thereby reducing the complexity and power consumption level of a chip, and ensuring the data exchange speed and quality. Also provided is a universal interface chip for achieving high-speed data transmission.

8 Claims, 3 Drawing Sheets

(51) Int. Cl.
*H04L 12/865* (2013.01)
*H04L 12/863* (2013.01)
*H04L 12/939* (2013.01)
*G06F 13/42* (2006.01)

(52) U.S. Cl.
CPC ........ *H04L 47/6275* (2013.01); *H04L 49/552* (2013.01); *Y02B 60/1228* (2013.01); *Y02B 60/1235* (2013.01)

(56) References Cited

U.S. PATENT DOCUMENTS

| | | | |
|---|---|---|---|
| 8,565,234 B1 * | 10/2013 | Mizrahi | ................ H04L 49/201 370/254 |
| 2009/0031053 A1 * | 1/2009 | Nonomura | .......... G06F 13/4045 710/22 |
| 2009/0113113 A1 | 4/2009 | Steele, Jr. et al. | |

FOREIGN PATENT DOCUMENTS

| WO | 9816046 A1 | 4/1998 |
|---|---|---|
| WO | 9832281 A1 | 7/1998 |
| WO | 0169919 A1 | 9/2001 |

* cited by examiner

METHOD AND UNIVERSAL INTERFACE CHIP FOR ACHIEVING HIGH-SPEED DATA TRANSMISSION

TECHNICAL FIELD

The present document relates to a data transmission technology of an interface chip, and in particular, to a method and universal interface chip for achieving high-speed data transmission.

BACKGROUND

With the rapid development of the contemporary application-specific integrated circuits, the application of the integrated circuits (chips) has been deep into various fields. In the system design of electronic circuits, the simple system scheme of being comprised of a single chip has been replaced by a scheme of multiple chip sets. The relationship between chips in a single board is closer, and interconnection and exchange visits between chips are inevitable. At the same time, along with the increase in the number of services and the increase in the complexity of the services, the problems of interconnection and exchange visits between chips has gradually become the bottlenecks of the performance of the system, the whole machine and the single board. Therefore, there is an urgent need for a more general, high-speed, simple, and effective interface to complete data exchange and communication operations between the integrated circuits (chips).

The inter-chip interconnection chips may be divided into two types, i.e., parallel interfaces and serial interfaces, or may also be divided into two types according to the order of magnitudes of the transmission speed, i.e., high-speed interfaces and low-speed interfaces. At present, the existing mainstream interfaces comprise UART, SPI, IIC, Serdes, USB, LPT and IDE etc. If the interfaces are divided according to the parallel/serial types, the UART, SPI, IIC, Serdes and USB are transmitted in the serial manner, while the LPT and IDE are parallel transmission interfaces. If the interfaces are divided according to the high-speed/low-speed types, the Serdes, USB and IDE are high-speed interfaces, and the UART, SPI, IIC and LPT belong to low-speed interfaces.

However, the logical complexity of the interfaces is a non-negligible problem when the integrated circuits (chips) are implemented logically. The logical complexity characterizes the scale and area of the hardware circuit, reflects the power consumption level from the side, and embodies the price and investment when the circuit is implemented. The high-speed interfaces typically have higher logical complexity and protocol standard, and also increase the complexity and power consumption level of the chip while obtaining the higher transmission bandwidth. The low-speed transmission interfaces have simple logical design characteristics. However, due to its simple protocol, the Quality of Service (QoS) of the transmission thereof is difficult to be ensured during practical applications.

SUMMARY

The primary purpose of the embodiments of the present document is to provide a method for achieving high-speed data transmission, thereby reducing the complexity and power consumption level of a chip, and ensuring the data exchange speed and quality.

In addition, a universal interface chip for achieving high-speed data transmission is further provided, thereby reducing the complexity and power consumption level of the chip, and ensuring the data communication quality.

In order to solve the above technical problem, the following technical schemes are utilized:

A method for achieving high-speed data transmission applicable to a universal interface chip, comprising:

A: a universal interface chip of a transmitting terminal monitoring and receiving a data packet to be transmitted;

B: the universal interface chip of the transmitting terminal repacking the received data packet according to a preset bit width and adding a check code, and transmitting the repacked data packet to a universal interface chip of a receiving terminal;

C: the universal interface chip of the transmitting terminal receiving a response message from the universal interface chip of the receiving terminal; and D: the universal interface chip of the transmitting terminal implementing a corresponding process on the data packet according to the received response message.

Alternatively, the method further comprises:

E: the universal interface chip of the receiving terminal receiving the data packet transmitted from the universal interface chip of the transmitting terminal; and F: the universal interface chip of the receiving terminal unpacking and checking the received data packet, and transmitting a corresponding response message to the universal interface chip of the transmitting terminal according to a check result.

Alternatively, the step F comprises:

the universal interface chip of the receiving terminal unpacking the received data packet, and checking whether the received data packet is correct;

when it is checked that the data packet is correct, the universal interface chip of the receiving terminal transmitting the correct data packet to a corresponding sub-system, and returning a response message that the reception is correct to the universal interface chip of the transmitting terminal; and when it is checked that the data packet is incorrect, the universal interface chip of the receiving terminal discarding the incorrect data packet, and returning a response message that the reception is incorrect to the universal interface chip of the transmitting terminal.

Alternatively, the step D comprises:

when the universal interface chip of the transmitting terminal receives the response message that the reception is correct, the universal interface chip of the transmitting terminal releasing internal occupied resources to continue to transmit other data packets to be transmitted; and when the response message that the reception is incorrect is received, retransmitting the corresponding data packet.

Alternatively, the step B comprises:

the universal interface chip of the transmitting terminal regulating a data transmission queue for the data to be transmitted according to a preset arbitration policy;

the universal interface chip of the transmitting terminal repacking a data packet in the highest priority order in the current data transmission queue according to the preset bit width and adding a check code; and the universal interface chip of the transmitting terminal transmitting the repacked data packet to the universal interface chip of the receiving terminal.

Alternatively, the arbitration policy comprises:

configuring data transmission priorities, and firstly transmitting data with a higher priority;

when the data has the same priority, firstly transmitting short data;

when the data has the same priority and the same data length, firstly transmitting data which is firstly arrived; and/or when the data has the same priority, the same data length, and the same incoming time node, firstly transmitting data from a data source where data transmission is not implemented for the longest time.

A universal interface chip for achieving high-speed data transmission, comprising a packing arbitration module and a packing module, wherein, the packing arbitration module is configured to monitor and receive a data packet to be transmitted; and the packing module is configured to repack the received data packet according to a preset bit width and add a check code, transmit the repacked data packet to a universal interface chip of a receiving terminal, receive a response message from the universal interface chip of the receiving terminal, and implement a corresponding process on the data packet according to the received response message.

Alternatively, the universal interface chip further comprises a packet receiving module and an unpacking module, wherein, the packet receiving module is configured to receive the data packet transmitted from the universal interface chip of the transmitting terminal; and the unpacking module is configured to unpack and check the received data packet, and transmit a corresponding response message to the universal interface chip of the transmitting terminal according to a check result.

Alternatively, the unpacking module is configured to unpack and check the received data packet, and transmit a corresponding response message to the universal interface chip of the transmitting terminal according to a check result by:

unpacking the received data packet, and checking whether the received data packet is correct;

when it is checked that the data packet is correct, transmitting the correct data packet to a corresponding sub-system, and returning a response message that the reception is correct to the universal interface chip of the transmitting terminal; and when it is checked that the data packet is incorrect, discarding the incorrect data packet, and returning a response message that the reception is incorrect to the universal interface chip of the transmitting terminal.

Alternatively, the packing module is configured to implement a corresponding process on the data packet according to the received response message by:

when the response message that the reception is correct is received, releasing internal occupied resources to continue to transmit other data packets to be transmitted; and when the response message that the reception is incorrect is received, retransmitting the corresponding data packet.

Alternatively, the packing module is configured o repack the received data packet according to a preset bit width and add a check code, and transmit the repacked data packet to a universal interface chip of a receiving terminal by:

regulating a data transmission queue for the data to be transmitted according to a preset arbitration policy;

repacking a data packet in the highest priority order in the current data transmission queue according to the preset bit width and adding a check code; and transmitting the repacked data packet to the universal interface chip of the receiving terminal.

Alternatively, the arbitration policy comprises:

configuring data transmission priorities, and firstly transmitting data with a higher priority;

when the data has the same priority, firstly transmitting short data;

when the data has the same priority and the same data length, firstly transmitting data which is firstly arrived; and/or when the data has the same priority, the same data length, and the same incoming time node, firstly transmitting data from a data source where data transmission is not implemented for the longest time.

With the above technical schemes, a data packet to be transmitted is repacked using a preset bit width and a check code is added; for a correct response message, system resources are released immediately, and for an incorrect response message, an automatic retransmission operation is implemented on the data packet, thereby reducing the complexity and power consumption level of a chip, and ensuring the data exchange speed and quality.

PREFERRED EMBODIMENTS OF THE PRESENT DOCUMENT

It should be understood that the specific embodiments described herein are merely used for explaining the present document, instead of limiting the present document.

Figure 1:
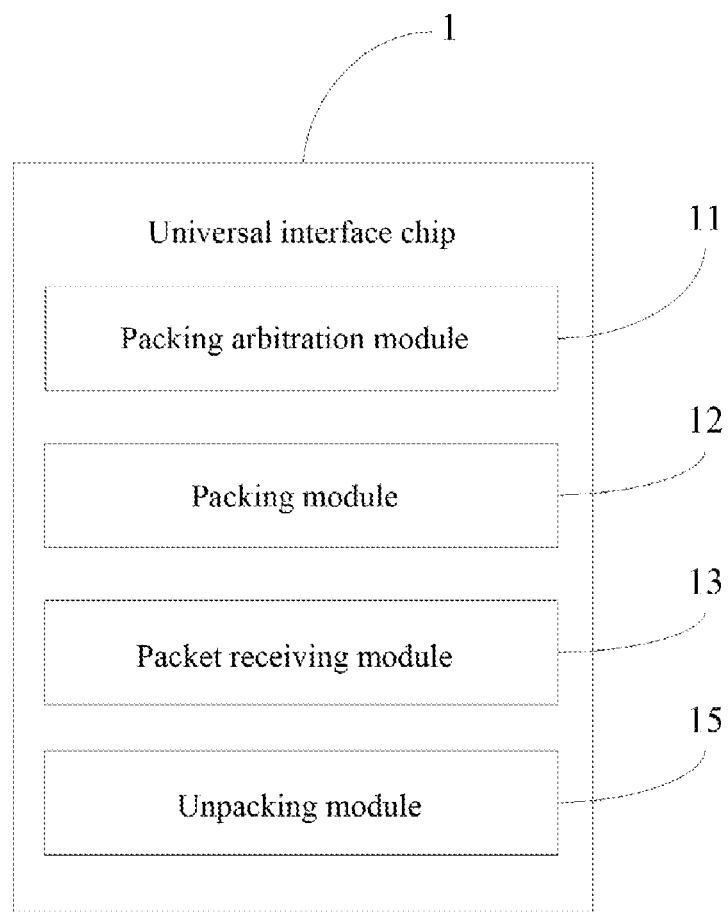
FIG. 1 is a diagram of system architecture of a universal interface chip for achieving high-speed data transmission according to a preferable embodiment.
Figure 2:
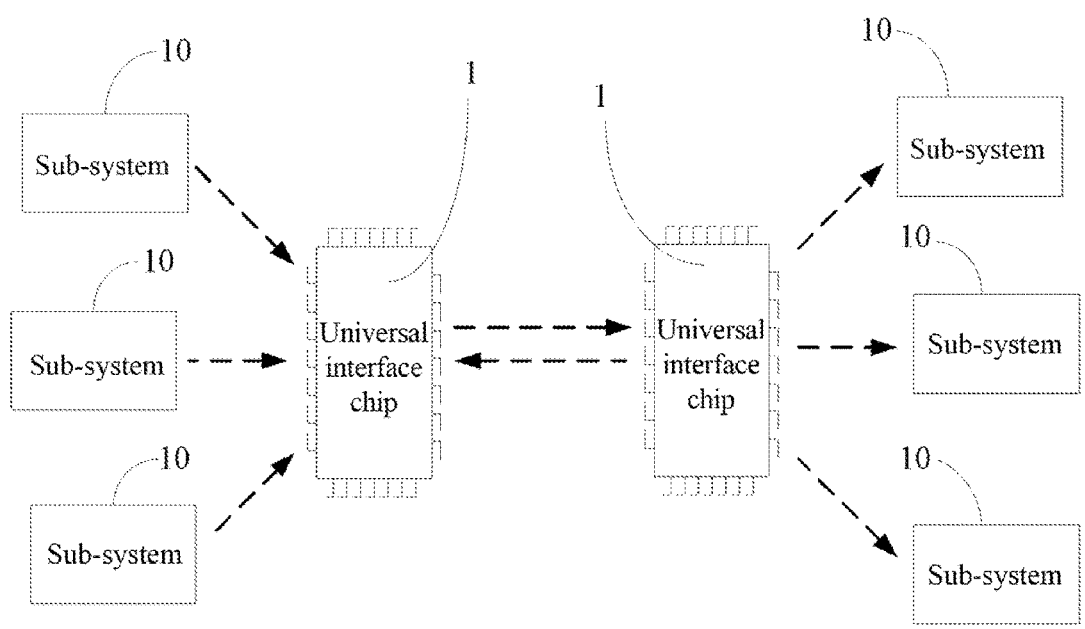
FIG. 2 is an illustrative diagram of data transmission between universal interface chips in FIG. 1.

As shown in FIG. 1, illustrated is a diagram of system architecture of a universal interface chip according to an embodiment of the present document. The universal interface chip 1 is used for data exchange and communication transmission. For example, as shown in FIG. 2, the universal interface chip 1 of the transmitting terminal transmits the data of at least one sub-system 10 (taking 3 as an example in the figure) which keep communication interconnection therewith to at least one sub-system 10 (taking 3 as an example in the figure) which keep communication interconnection with a universal interface chip 1 of a receiving terminal. A number of connection pins of a physical layer of the universal interface chip 1 is variable.

The universal interface chip 1 comprises a packing arbitration module 11, a packing module 12, a packet receiving module 13, and an unpacking module 15.

For better description of the present document, functions of the packing arbitration module 11, the packing module 12, the packet receiving module 13, and the unpacking module 15 are set forth below using the universal interface chip 1 of the transmitting terminal and the universal interface chip 1 of the receiving terminal respectively. It should be illustrated that the universal interface chip 1 of the transmitting terminal is a universal interface chip 1 which needs to transmit the data to another universal interface chip 1; and the universal interface chip 1 of the receiving terminal is a universal interface chip 1 which receives the data transmitted from the universal interface chip 1 of the transmitting terminal.

1. The universal interface chip 1 of the transmitting terminal:

the packing arbitration module 11 is configured to monitor and receive a data packet to be transmitted from a sub-system 10, and regulate a data transmission queue for the data to be transmitted according to a preset arbitration policy.

In the present embodiment, the arbitration policy comprises: configuring data transmission priorities for various sub-systems 10, and firstly transmitting data with a higher priority; when the data has the same priority, firstly transmitting short data; when the data has the same priority and the same data length, firstly transmitting data which is firstly arrived; and when the data has the same priority, the same data length, and the same incoming time node, firstly transmitting data from a sub-system 10 (i.e., a data source) where data transmission is not implemented for the longest time. In other embodiments of the present document, the arbitration policy is configured to include any other suitable conflict arbitration policies for data transmission.

The packing module 12 is configured to repack a data packet in the highest priority order in the current data transmission queue according to the preset bit width and add a check code.

In the present embodiment, the preset bit width is in accordance with a number of connection pins of a physical layer of the universal interface chip 1. In other embodiments of the present document, the preset bit width is not in accordance with the number of connection pins of the physical layer of the universal interface chip 1.

A bit width of the data packet to be transmitted from the sub-system 10 may be less than the preset bit width, or may also be larger than the preset bit width. In the present embodiment, the packing module 12 repacks the data packet to be transmitted which is less than the preset bit width through splicing, and repacks the data packet to be transmitted which is larger than the preset bit width through segmentation, so that the bit width of the repacked data packet is equal to the preset bit width.

In the present embodiment, the check code comprises a Cyclic Redundancy Check (CRC) code and an Acknowledgement Number (ACK Number). In other embodiments of the present document, the check code comprises other suitable check codes.

The packing module 12 is configured to transmit the repacked data packet to the universal interface chip 1 of the receiving terminal.

In the present embodiment, the universal interface chip 1 of the receiving terminal may not correctly obtain the CRC code and the ACK Number due to the deviation and jitter of the clock. Therefore, the universal interface chip 1 of the transmitting terminal extends the transmission timing of the repacked data packet to an effective work clock of 3 universal interface chips 1. The universal interface chip 1 of the receiving terminal samples the value in the middle cycle during reception, so as to avoid failure of error check due to incorrect information sampling, and at the same time, ensure the accuracy of the check information when the work clock of the universal interface chip 1 has a high frequency.

2. The universal interface chip 1 of the receiving terminal:

the packet receiving module 13 is configured to receive the data packet transmitted from the universal interface chip 1 of the transmitting terminal.

The unpacking module 15 is configured to unpack the received data packet, and check whether the received data packet is correct. In the present embodiment, the unpacking module 15 checks the CRC code and the ACK Number of the received data packet; and in other embodiments of the present document, the unpacking module 15 checks any other suitable check codes of the received data packet.

The unpacking module 15 is further configured to when it is checked that the data packet is correct, transmit the correct data packet to a corresponding sub-system 10, and return a response message that the reception is correct to the universal interface chip 1 of the transmitting terminal; and when it is checked that the data packet is incorrect, discard the incorrect data packet, and return a response message that the reception is incorrect to the universal interface chip 1 of the transmitting terminal.

3. The universal interface chip 1 of the transmitting terminal:

the packing module 12 is further configured to receive the response message transmitted from the universal interface chip 1 of the receiving terminal, when the response message that the reception is correct is received, release internal occupied resources to continue to transmit other data packets to be transmitted; and when the response message that the reception is incorrect is received, retransmit the corresponding data packet.

Figure 3:
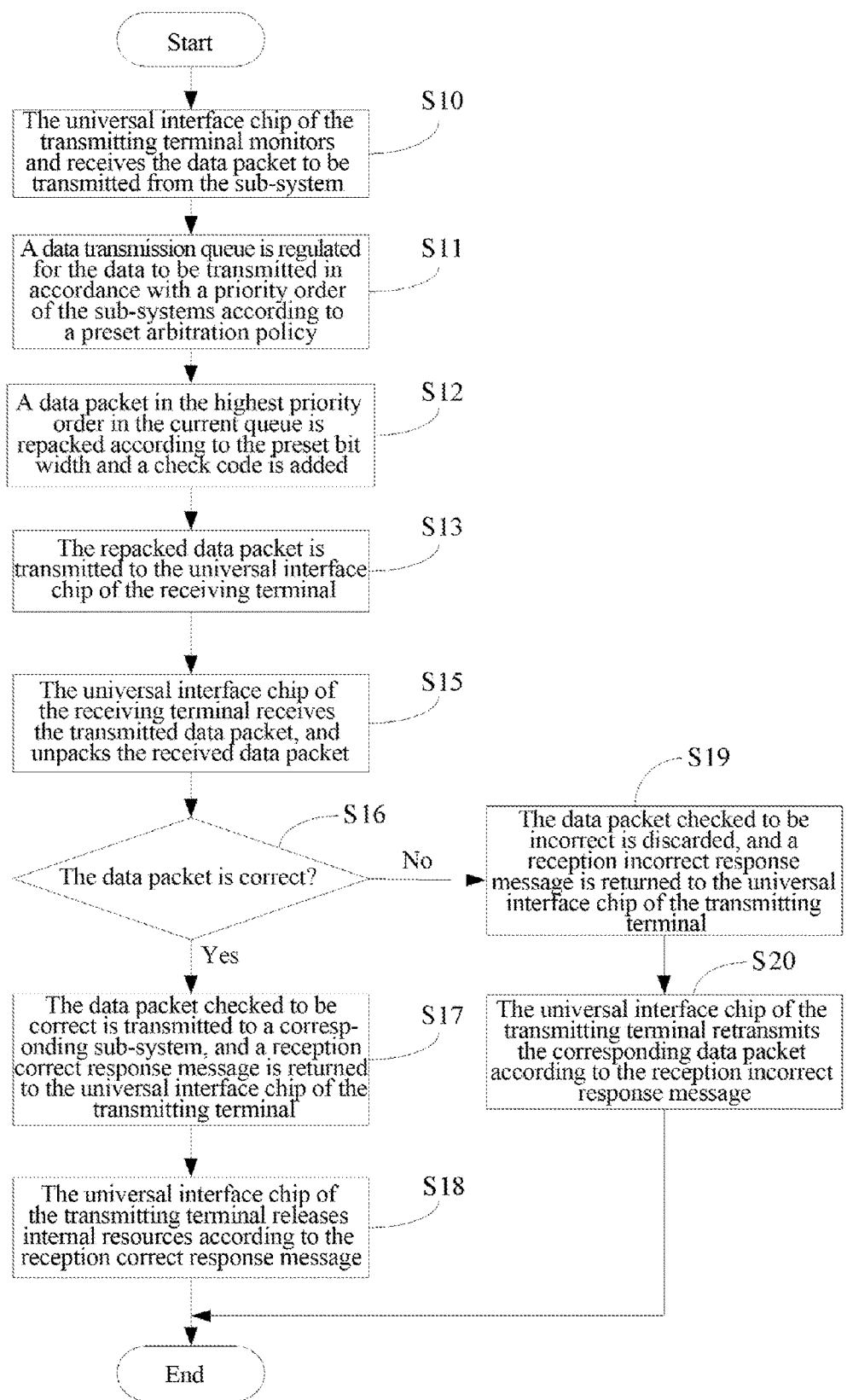
FIG. 3 is a flowchart of a specific implementation of a method for achieving high-speed data transmission using the universal interface chip in FIG. 1 according to a preferable embodiment.

As shown in FIG. 3, illustrated is a flowchart of a specific implementation of a method for achieving high-speed data transmission using the universal interface chip in FIG. 1 according to a preferable embodiment.

It should be emphasized that the flowchart illustrated in FIG. 3 is merely a preferable embodiment, and those skilled in the art should understand that any embodiment constructed according to the idea of the present document should not depart from the scope covered by the following technical schemes.

The universal interface chip 1 of the transmitting terminal monitors and receives a data packet to be transmitted from the sub-system 10; and repacks the received data packet according to a preset bit width and adds a check code; transmits the repacked data packet to a universal interface chip 1 of a receiving terminal; receives a response message from the universal interface chip 1 of the receiving terminal; and implements a corresponding process on the data packet according to the received response message.

More specifically, the universal interface chip 1 of the receiving terminal receives the data packet transmitted from the universal interface chip 1 of the transmitting terminal; unpacks and checks the received data packet, and transmits a corresponding response message to the universal interface chip 1 of the transmitting terminal according to a check result.

Data exchange and communication transmission between universal interface chips 1 (i.e., between the universal interface chip 1 of the transmitting terminal and the universal interface chip 1 of the receiving terminal) will be implemented in conjunction with the present embodiment step by step.

In step S10, the packing arbitration module 11 of the universal interface chip 1 of the transmitting terminal monitors and receives the data packet to be transmitted from the sub-system 10.

In step S11, the packing arbitration module 11 of the universal interface chip 1 of the transmitting terminal regulates a data transmission queue for the data to be transmitted according to a preset arbitration policy.

In the present embodiment, the arbitration policy comprises: configuring data transmission priorities for various sub-systems 10, and firstly transmitting data with a higher priority; when the data has the same priority, firstly transmitting short data; when the data has the same priority and the same data length, firstly transmitting data which is firstly arrived; and when the data has the same priority, the same data length, and the same incoming time node, firstly transmitting data from a sub-system 10 where data transmission is not implemented for the longest time. In other embodiments of the present document, the arbitration policy is configured to include any other suitable conflict arbitration policies for data transmission.

In step S12, the packing module 12 of the universal interface chip 1 of the transmitting terminal repacks a data packet in the highest priority order in the current data transmission queue according to the preset bit width and adds a check code.

A bit width of the data packet to be transmitted from the sub-system 10 may be less than the preset bit width, or may also be larger than the preset bit width. In the present embodiment, the packing module 12 repacks the data packet to be transmitted which is less than the preset bit width through splicing, and repacks the data packet to be transmitted which is larger than the preset bit width through segmentation, so that the bit width of the repacked data packet is equal to the preset bit width.

In step S13, the packing module 12 of the universal interface chip 1 of the transmitting terminal transmits the repacked data packet to the universal interface chip 1 of the receiving terminal.

In step S15, the packet receiving module 13 of the universal interface chip 1 of the receiving terminal receives the data packet transmitted from the universal interface chip 1 of the transmitting terminal, and the unpacking module 15 of the universal interface chip 1 of the receiving terminal unpacks the received data packet.

In step S16, the unpacking module 15 of the universal interface chip 1 of the receiving terminal checks whether the received data packet is correct.

When the received data packet is correct, the following steps S17 and S18 will be implemented; or when the received data packet is incorrect, the following steps S19 and S20 will be implemented.

In step S17, the unpacking module 15 of the universal interface chip 1 of the receiving terminal transmits the correct data packet to a corresponding sub-system 10, and returns a response message that the reception is correct to the universal interface chip 1 of the transmitting terminal.

In step S18, the packing module 12 of the universal interface chip 1 of the transmitting terminal releases internal occupied resources to continue to transmit other data packets to be transmitted.

In step S19, the unpacking module 15 of the universal interface chip 1 of the receiving terminal discards the incorrect data packet, and returns a response message that the reception is incorrect to the universal interface chip 1 of the transmitting terminal.

In step S20, the packing module 12 of the universal interface chip 1 of the transmitting terminal retransmits the corresponding data packet.

The above description is merely preferable embodiments of the present document, instead of limiting the patent scope of the present document. Any equivalent structure or equivalent flow transformation, which is made using the contents of the specification of the present document and the accompanying drawings and is directly or indirectly applied to other related technical fields, is similarly included in the patent protection scope of the present document.

INDUSTRIAL APPLICABILITY

With the above technical schemes, a data packet to be transmitted is repacked using a preset bit width and a check code is added; and for a correct response message, system resources are released immediately, and for an incorrect response message, an automatic retransmission operation is implemented on the data packet, thereby reducing the complexity and power consumption level of a chip, and ensuring the data exchange speed and quality. Therefore, the present document has very strong industrial applicability.

What is claimed is:

1. A method for achieving high-speed data transmission applicable to a universal interface chip, comprising steps of:
    A, a universal interface chip of a transmitting terminal monitoring and receiving a data packet to transmit;
    B, the universal interface chip of the transmitting terminal repacking the received data packet according to a preset bit width and adding a check code, and transmitting the repacked data packet to a universal interface chip of a receiving terminal;
    C, the universal interface chip of the transmitting terminal receiving a response message from the universal interface chip of the receiving terminal; and
    D, the universal interface chip of the transmitting terminal implementing a corresponding process on the data packet according to the received response message,
    wherein, the step B comprises:
    the universal interface chip of the transmitting terminal regulating a data transmission queue for the data to be transmitted according to a preset arbitration policy:
    the universal interface chip of the transmitting terminal repacking a data packet in a highest priority order in a current data transmission queue according to a preset bit width and adding a check code: and
    the universal interface chip of the transmitting terminal transmitting the repacked data packet to the universal interface chip of the receiving terminal;
    wherein, the arbitration policy comprises: configuring data transmission priorities, and firstly transmitting data with a higher priority;
    when the data has same priority, firstly transmitting short data;
    when the data has the same priority and same data length, firstly transmitting data which is firstly arrived; and/or
    when the data has the same priority, the same data length, and same incoming time node, firstly transmitting data from a data source where data transmission is not implemented for a longest time.

2. The method for achieving high-speed data transmission according to claim 1, further comprising steps of:
    E, the universal interface chip of the receiving terminal receiving the data packet transmitted from the universal interface chip of the transmitting terminal; and
    F, the universal interface chip of the receiving terminal unpacking and checking the received data packet, and transmitting a corresponding response message to the universal interface chip of the transmitting terminal according to a check result.

3. The method for achieving high-speed data transmission according to claim 2, wherein, the step F comprises:
    the universal interface chip of the receiving terminal unpacking the received data packet, and checking whether the received data packet is correct;
    when it is checked that the data packet is correct, the universal interface chip of the receiving terminal transmitting the data packet checked to be correct to a corresponding sub-system, and returning a reception correct response message to the universal interface chip of the transmitting terminal; and when it is checked that the data packet is incorrect, the universal interface chip of the receiving terminal discarding the data packet checked to be incorrect, and returning a reception incorrect response message to the universal interface chip of the transmitting terminal.

4. The method for achieving high-speed data transmission according to claim 3, wherein, the step D comprises:

when the universal interface chip of the transmitting terminal receives the reception correct response message, the universal interface chip of the transmitting terminal releasing internal occupied resources to continue to transmit other data packets to be transmitted; and when the reception incorrect response message is received, retransmitting the corresponding data packet.

5. A universal interface chip for achieving high-speed data transmission, comprising a packing arbitration hardware module and a packing hardware module, wherein, the packing arbitration hardware module is configured to monitor and receive a data packet to be transmitted; and the packing hardware module is configured to repack the received data packet according to a preset bit width and add a check code, transmit the repacked data packet to a universal interface chip of a receiving terminal, receive a response message from the universal interface chip of the receiving terminal, and implement a corresponding process on the data packet according to the received response message, wherein, the packing hardware module is configured to repack the received data packet according to a preset bit width and add a check code, and transmit the repacked data packet to a universal interface chip of a receiving terminal by a following mode:

regulating a data transmission queue for the data to be transmitted according to a preset arbitration policy;

repacking a data packet in a highest priority order in a current data transmission queue according to the preset bit width and adding a check code; and transmitting the repacked data packet to the universal interface chip of the receiving terminal, wherein, the arbitration policy comprises:

configuring data transmission priorities, and firstly transmitting data with a higher priority;

when the data has a same priority, firstly transmitting short data;

when the data has the same priority and a same data length, firstly transmitting data which is firstly arrived; and/or when the data has the same priority, the same data length, and a same incoming time node, firstly transmitting data from a data source where data transmission is not implemented for a longest time.

6. The universal interface chip according to claim 5, wherein, the universal interface chip further comprises a packet receiving hardware module and an unpacking hardware module, wherein, the packet receiving hardware module is configured to receive the data packet transmitted from the universal interface chip of the transmitting terminal; and the unpacking hardware module is configured to unpack and check the received data packet, and transmit a corresponding response message to the universal interface chip of the transmitting terminal according to a check result.

7. The universal interface chip according to claim 6, wherein, the unpacking hardware module is configured to unpack and check the received data packet, and transmit a corresponding response message to the universal interface chip of the transmitting terminal according to a check result by a following mode:

unpacking the received data packet, and checking whether the received data packet is correct;

when it is checked that the data packet is correct, transmitting the data packet check to be correct to a corresponding sub-system, and returning a reception correct response message to the universal interface chip of the transmitting terminal; and when it is checked that the data packet is incorrect, discarding the data packet checked to be incorrect, and returning a reception incorrect response message to the universal interface chip of the transmitting terminal.

8. The universal interface chip according to claim 7, wherein, the packing hardware module is configured to implement a corresponding process on the data packet according to the received response message by a following mode:

when the reception correct response message is received, releasing internal occupied resources to continue to transmit other data packets to be transmitted; and when the reception incorrect response message is received, retransmitting the corresponding data packet.

* * * * *